No. 755,417. Patented March 22, 1904.

UNITED STATES PATENT OFFICE.

JAN VILIM, OF PRAGUE, AUSTRIA-HUNGARY, AND FRIEDRICH HAUSER, OF NAEFELS, SWITZERLAND; SAID HAUSER ASSIGNOR TO SAID VILIM.

METHOD OF PHOTOGRAPHIC HALF-TONE FOR BOOK-PRINTING AND LITHOGRAPHY.

SPECIFICATION forming part of Letters Patent No. 755,417, dated March 22, 1904.

Application filed May 14, 1902. Serial No. 107,346. (No specimens.)

*To all whom it may concern:*

Be it known that we, JAN VILIM, a subject of the Emperor of Austria-Hungary, residing at Prague, in the Kingdom of Bohemia, Empire of Austria-Hungary, and FRIEDRICH HAUSER, a citizen of Switzerland, residing at Naefels, canton of Glarus, Switzerland, have invented a new and useful Improvement in Methods of Photographic Half-Tone for Book-Printing and Lithography; and we hereby declare that the following is a full, clear, and exact description of the invention, which will enable others skilled in the art to which it appertains to make and use the same.

In the asphalt methods hitherto used half-tone negatives could not be copied in a simple way on smooth surfaces. Before the etching is possible the half-tone must be broken by a net of fine lines, so as to divide it into dots.

The object of this invention is to produce plates for book-prints or lithography for one or more colors by means of any half-tone negative without the use of a screen or the like and without any intermediate manipulation. In order to attain this object the asphalt is primarily rendered more sensitive to light by treatment with different substances, for instance, by purifying it by means of ether—that is to say, the asphalt can be divided by various known solvents into constituents possessing different degrees of sensitiveness to light—and which show, moreover, other different qualities—as, for instance, such as occur in the etching of the printing-plates. The dissolving action is continued until the asphalt is sufficiently sensitive to light, enough unsensitive substance being, however, retained to maintain the formation of grain in the layers which are to be produced by it. The precise degree to which the process of solution must be continued can be easily seen from the fact that the grain will be clearly visible in the dried layer. Any kind of asphalt may be used provided it is sufficiently well comminuted.

The liquid consists of benzol, alcohol, ether, and chloroform in determined proportions for different kinds of grain, as will be hereinafter set forth, the property of mutual repulsion of the alcohol and chloroform being herein utilized. In consequence of this property very fine serpentine-shaped lines are produced when the liquid is poured on the smooth plate and during the evaporation of the chloroform and alcohol, said lines being visible to the eye as very fine connected grain and having a suitable shape for the production of pictures. This reaction can produce the suitable grain only by the mixture herein set forth in determined proportions, because experience shows that if alcohol is added to a solution of asphalt in chloroform, even to a very small extent, the said solution cannot be poured smoothly on a surface for the reason that the chloroform and alcohol are repulsed, the layer being consequently separated. In the mixture herein described the benzol serves as an adhesive while the ether increases the effect of the alcohol. If benzol were not added, the grain would be washed away in the developing process, and if ether were not present the grain would not show the required binding.

When the prepared asphalt has been dissolved by means of benzol, alcohol, ether, and chloroform, the said solution is applied in layers of suitable thickness upon a smooth surface of metal or stone. They are thereupon dried in temperatures of about 15° to 30° centigrade in combination with appropriate degrees of humidity which must prevail to produce the desired size of grain, which may be then discerned in the dry layer. Then the copying process is carried out under an ordinary negative. The proportions of mixing are as follows: (*a*) For coarse grain, asphalt, benzol, alcohol, ether, and chloroform in the proportion of one to one to four to five to ten, and (*b*) for fine grain, one to one to two and one-half to five to ten, so that the average proportion of benzol, alcohol, ether, and chloroform equals approximately one to one to three to five to ten. The final treatment of such a copy consists in the development with proper mixtures of turpentine, benzin, benzol, and the like, whereby the parts of the layers of grain and asphalt, which is composed of several substances and is lighted up, is developed, and at the same time all the parts of the layers which are not lighted up are removed and the formation of grain is clearly to be seen in the completed and developed picture. Such a plate is after the usual process of etching ready for print.

For the purpose of not losing the finer parts of the picture in the said final treatment the plate is covered with moistened filtering-paper, and this is allowed to evaporate by itself.

Having fully described our invention, what we desire to claim and secure by Letters Patent is—

1. In photolithography, the process of preparing a half-tone plate, consisting in coating the plate with sensitive asphalt dissolved in mutally-repulsive solvents, and evaporating the solvents, substantially as specified.

2. In photolithograpy, the process of preparing a half-tone plate, consisting in coating the plate with sensitive asphalt dissolved in a mixture containing alcohol and chloroform, and evaporating the solvent.

3. In photolithography, the process of preparing a half-tone plate, consisting in coating the plate with a solution of sensitive asphalt in a mixture of benzol, alcohol, ether and chloroform, and evaporating the solvent in a moist atmosphere.

In witness whereof we have hereunto set our hands in presence of witnesses.

JAN VILIM.
FRIEDRICH HAUSER.

Witnesses as to signature of Jan Vilim:
ADOLPH FISCHER,
LADISLAR VOJÁČEL,

Witnesses as to signature of Friedrich Hauser:
A. LIEBERKNECHT,
O. SCHNABEL.